July 23, 1957 R. A. WIKE 2,800,086
CONVERTIBLE VEHICLE
Filed April 5, 1954 3 Sheets-Sheet 1
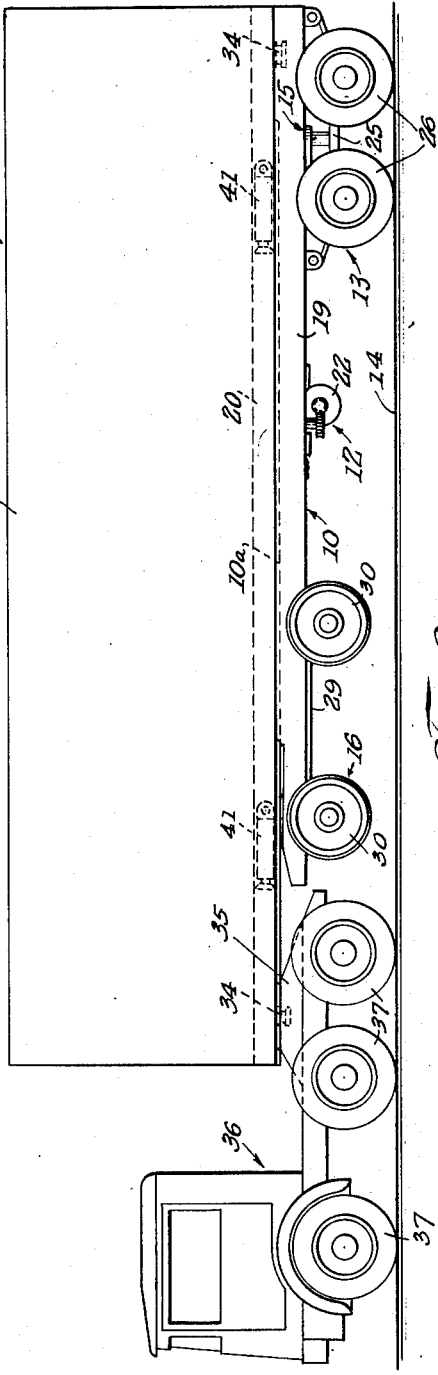
INVENTOR.
RALPH A. WIKE
BY C. G. Stratton
ATTORNEY July 23, 1957 R. A. WIKE 2,800,086
CONVERTIBLE VEHICLE
Filed April 5, 1954 3 Sheets-Sheet 2
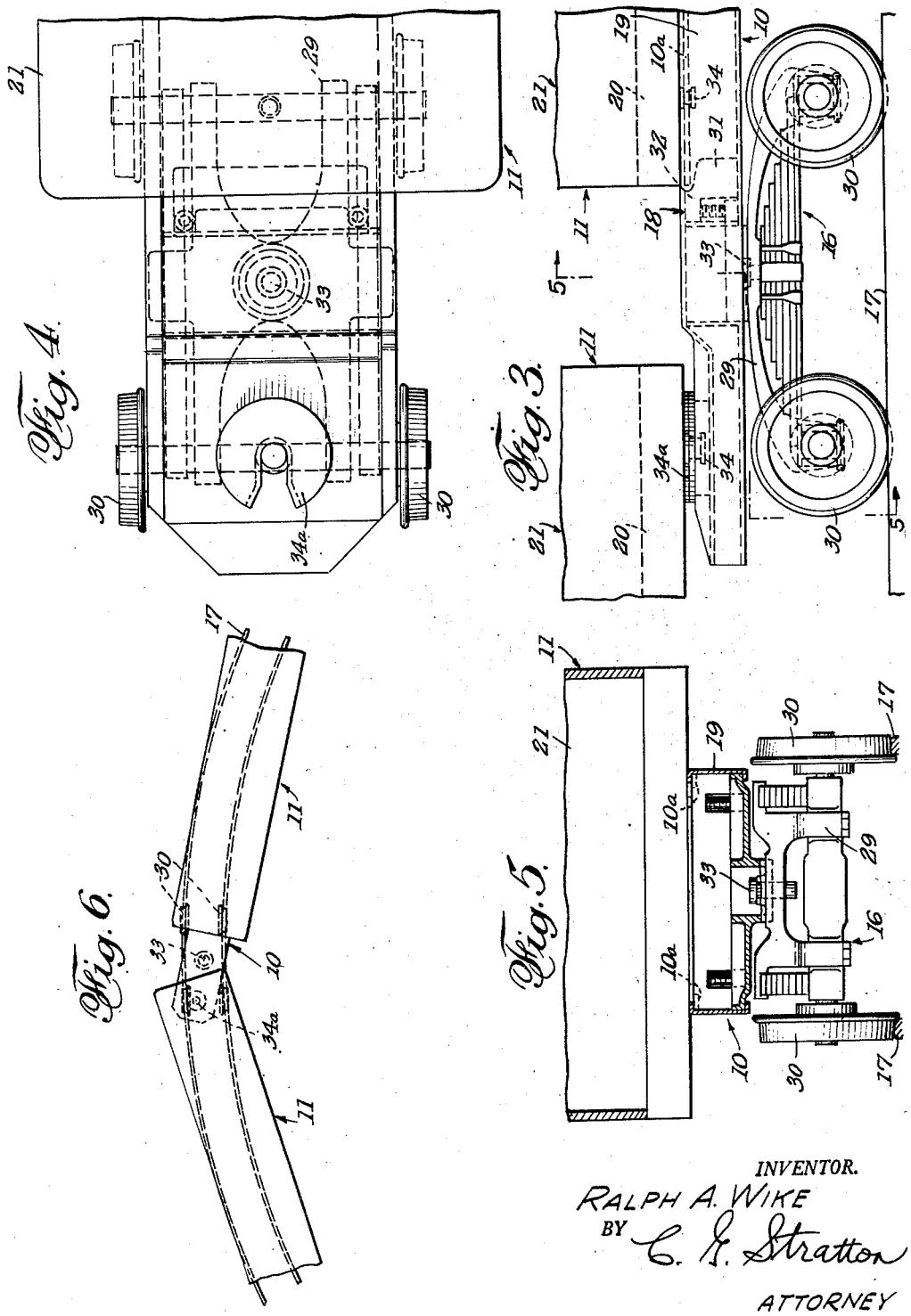
INVENTOR.
RALPH A. WIKE
BY C. E. Stratton
ATTORNEY July 23, 1957
R. A. WIKE
2,800,086
CONVERTIBLE VEHICLE
Filed April 5, 1954
3 Sheets-Sheet 3
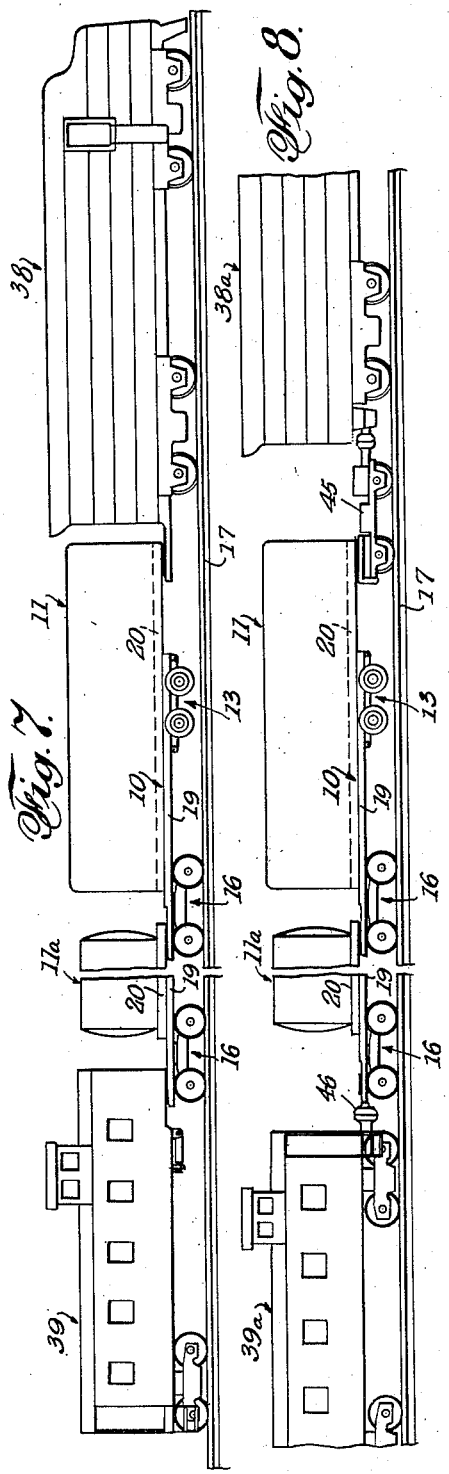
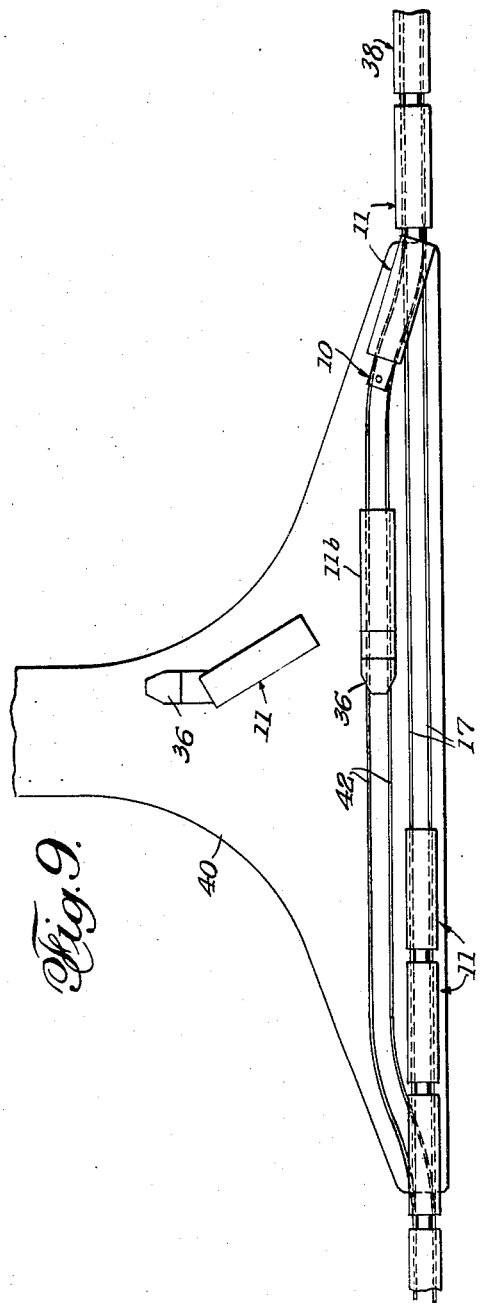
INVENTOR.
RALPH A. WIKE
BY C. G. Stratton
ATTORNEY

United States Patent Office 2,800,086
Patented July 23, 1957

2,800,086

CONVERTIBLE VEHICLE

Ralph A. Wike, Beverly Hills, Calif.

Application April 5, 1954, Serial No. 421,056

8 Claims. (Cl. 105—159)

This invention relates to a convertible vehicle and deals more particularly with a cargo-carrying transportation unit adapted for selective movement along a road or highway or on rails. This application is a continuation-in-part of my pending application, Serial No. 285,158, filed April 30, 1952, and bearing the title of the present application, now abandoned.

The transportation of freight from one place to another frequently entails at least one and sometimes two or more transpositions of the cargo between rail and highway carriers. The reloading of the cargo, entailed in such transpositions, is time-consuming, costly, and often deleteriously affects the condition of the goods because of excessive handling.

Recognizing the faults inherent in the present handling of cargo that is consigned for both rail and highway transportation, it is an object of the present invention to provide a cargo-carrying vehicle that may be employed to transport cargo from a point of shipment to its ultimate destination without reloading of the cargo when changing from rail to highway transportation and vice versa.

Another object of the invention is to provide a vehicle of the character indicated that is arranged to be incorporated as a unit of a train of such vehicles, and is adapted to be converted into a semi-trailer or like unit to be moved along a highway by a conventional tow cab, all without the need for transposing the cargo in said vehicle.

It is contemplated that transfer of the vehicle from rail to highway or highway to rail disposition may be effected at any rail-highway crossing or at suitable freight yard points. A further object of the invention, therefore, is to provide a novel system of freight handling whereby a cargo-carrying unit is, unitarily and with easy facility, transposed from rail to highway or from highway to rail without reloading of the cargo The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, preferred embodiments of the present invention, which are given by way of illustration or example only.

In the drawings, like reference characters designate similar parts in the several views.

Fig. 1 is a side elevational view of a convertible vehicle according to the present invention, arranged as a highway trailer.

Fig. 2 is a similar view of said vehicle, arranged for rail traction.

Fig. 3 is an enlarged fragmentary side elevational view showing means interconnecting two vehicles when arranged as in Fig. 2.

Fig. 4 is a plan view of one of the vehicle fragments shown in Fig. 3.

Fig. 5 is a cross-sectional view as taken on line 5—5 of Fig. 3.

Fig. 6 is a plan view, to a reduced scale, of two connected vehicles on a curved railway track.

Fig. 7 is a broken side view showing a railway train comprised of such vehicles combined with a locomotive and caboose.

Fig. 8 is a similar view of a modification.

Fig. 9 is a plan view, to a further reduced scale, of a rail-highway crossing or junction, showing the manner of transposing said vehicles between rail and highway disposition.

The present convertible vehicle comprises, generally, a chassis 10, a cargo-holding body 11 disposed upon said chassis, means 12 for shifting said body longitudinally relative to the chassis, a wheel-truck assembly 13 connected to one end of the chassis and adapted to have traction on a paved road or highway 14, means 15 to raise and lower said assembly relative to the chassis 10, a wheel-truck assembly 16 connected to the other end of the chassis and adapted to have traction on rails or tracks 17, and means 18 to raise and lower the latter assembly relative to said chassis.

The chassis 10 may comprise a suitable elongated and rigid frame 19. As can be seen from the drawings, the overall length of said frame is substantially less than the length of the body 11 to provide an overhang of said body beyond said chassis frame at one end or the other according to the direction said body is shifted.

The body 11 is shown as of the box car type although the same may vary and be of any other conventional type. Fig. 7, at 11a, shows a tank car body. Body 11 comprises a bed or floor 20 of substantial strength and rigidity and a superstructure 21 on said bed which may have any desired cargo-confining form. Guideways 10a may be provided in any conventional manner to guide the body 11 for longitudinal displacement to overhang one end or the other of chassis 10.

The means 12 for effecting such displacement or movement of body 11 relative to chassis 10 is shown as electromechanical, although the same may be operated by fluid pressure as by pneumatic or hydraulic instrumentalities. As shown, means 12 comprises an electric motor 22, suitable reduction and, therefore, power gearing 23 driven by said motor, and a feed drive 24 between said gearing and the bed 20 of the body 11. By making motor 22 a reversing motor or by providing reverse gearing in means 12, the same may be employed to shift body 11 along chassis 10 to an overhang at one end, as in Fig. 1, or to an overhang at the opposite end, as in Fig. 2. It will be clear that mechanism controlled by pressure fluid will accomplish such movement of the body.

The wheel-truck assembly 13 is disposed at one end of chassis 10 and serves to support said end. As shown, said assembly comprises a truck frame 25 mounting suitable tire-provided wheels 26 in any conventional arrangement. The truck frame 25 may be raised or lowered, that is, moved relative to the chassis 10 by means 15.

The means 15 comprises an electric motor 27, carried by chassis 10, which, by means of suitable reduction gearing 28, retracts and projects truck assembly 13 relative to the chassis. The means 15 also may be pressure-fluid operated.

The wheel-truck assembly 16 may be generally conventional of railway trucks. As shown, the same comprises a truck frame 29 mounting a set of rail-engaging wheels 30. The means 18 comprises an electric motor 31 and suitable reduction gearing 32, so that said assembly 16 may be retracted or projected in a manner similar to the retraction and projection of assembly 13. As can best be seen from Figs. 3 to 6, the truck 16, in addition to being adjustable vertically relative to chassis 19, is connected to said chassis by a pivot 33.

Each end of the body bed 20 is provided with a connection device shown as pins 34 and hitch connection 34a, adapting the above-described vehicle for connection to an adjacent vehicle. Said devices may be retracted when not in use. As shown in Fig. 1, the connection device at one end is adapted to be swivelably connected to a hitch 35 on a trailer cab 36 of generally conventional form. As shown in Fig. 2, the other connection device is adapted to be swivelably connected to the hitch connection 34a on the projecting end of the chassis to a similar vehicle in articulated train-like arrangement.

It will be noted from Fig. 1 that body 11 has been moved relative to chassis 10 so as to locate the truck as-assembly 13 at the end of the vehicle that is most remote from cab 36. Thus, a highway unit is provided that has traction not only on wheels 26 but also on such wheels 37 as may be provided on said cab. Therefore, with truck assembly 16 retracted, the vehicle shown is movable along a highway in the manner generally typical of highway trailers.

As shown in Figs. 2 and 7, body 11 has been moved relative to chassis 10 so as to locate truck assembly 16 at the opposite end of the vehicle so that said truck assembly resides beneath the adjacent ends of two such vehicles in train formation. Consequently, a train made up of two or more such vehicles and having their truck assemblies 13 retracted, has rail traction at the trailing end of the vehicle. As seen in Fig. 7, a locomotive 38 is connected to the overhang of body 11 that is opposite to truck assembly 16. Therefore, the direction of movement of the vehicle on a highway is opposite to the direction of movement on rails. The connection between the locomotive and the vehicle has the same swivelable characteristics as the connection with cab 36. If a caboose 39 is used, the same may be connected to the end vehicle of a train by means of a similar swivel connection, as shown in Fig. 7.

Referring now to Fig. 9, the rails or tracks 17 are shown associated with a paved area 40 which is shown as extending to said rails but may comprise a highway intersection with said rails. In any case, a suitable area of transposition of the vehicles from road to rail or from rail to road may be effected by the provision of a pavement flush with the rails.

Assuming vehicle 11b is to be extracted from a train of such vehicles at a transition point, the trailing end of the vehicle 11b is uncoupled from those at the rear and the forward portion of the train is advanced to provide a gap into which a cab 36 may be backed. Truck assembly 13 is then lowered to provide a two-truck support for said vehicle. The forward end of the train is now uncoupled from vehicle 11b and the body 11 thereof shifted to the position of Fig. 1. The hitch 35 of cab 36 is now engaged with connection device 34 on body 11 of said vehicle. When said truck assembly 16 is retracted, cab 36 may readily tow the vehicle onto pavement 40 and thence to its destination. As many more of the vehicles as is desired may be cut out in the same way. Thereafter, the vehicles of the train may be re-connected and drawn by locomotive 38 to another point or area of transposition. If desired, as shown in Fig. 9, a shunt or by-pass track 42 may be provided alongside of track 17 and the same used for cutting out vehicles from the train, thereby leaving track 17 for movement of the remainder of the train to its next point of destination.

Introducing a vehicle into a train is as easily accomplished by a substantial reversal of the foregoing method of removing a vehicle.

The jack means 41 at either or both ends of bed 20 have the function of supporting the vehicle on a pavement without subjecting said pavement to damage by flanged metal wheels 36. Thus the vehicles may be stored in depots or other places until ready for movement to a place of destination.

One of the coupling pins 34 may be relatively stronger than the other since the same comprises a train hitch, while the other pin 34 may comprise a standard highway trailer hitch (as shown in Figs. 1, 2 and 3).

In the modification of Fig. 8, the cargo vehicles are connected as described for the form of Fig. 7. However, in order to retain standard construction of engine and caboose, a special truck 45 may be used for connecting the standard engine 38a with the first vehicle of a train thereof and a special short shank coupler 46 may be used to connect the standard caboose 39a and the last vehicle in a train thereof.

While the foregoing has illustrated and described what are now regarded as the preferred embodiments, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. A convertible vehicle comprising an elongated chassis, a wheel truck under each end of the chassis, one truck being provided with pavement-engaging wheels and the other truck being provided with flanged rail-engaging wheels, means for selectively and independently raising and lowering each truck toward and from the chassis, a cargo body on the chassis, means to move the cargo body longitudinally on the chassis and to hold it in its moved position.

2. In combination, a pair of convertible vehicles each having a horizontal chassis, a wheel truck under each end of each chassis, one of said wheel trucks being provided with pavement-engaging wheels and the other with flanged rail-engaging wheels, means for selectively and independently raising and lowering each truck with respect to the chassis, a cargo body on each chassis, means to shift the cargo bodies of each chassis longitudinally of the chassis and to hold them fixed in shifted position, the cargo body when so shifted being in a position to overhang the end of an adjacent chassis.

3. The invention as defined in claim 2 in which there is an articulated connection between the overhanging body and the adjacent chassis.

4. An articulated pair of convertible vehicles comprising a horizontal chassis for each vehicle, wheel trucks under each end of each chassis, one truck on each chassis being provided with pavement-engaging wheels and the other truck on each chassis being provided with flanged rail-engaging wheels, means for selectively and independently raising and lowering each truck toward and from the chassis, a cargo body on at least one of said chassis, (means to shift said cargo body longitudinally) on its mounting chassis and to cause it to overhang the end of an adjacent chassis, and means for securing the overhung portion of the cargo body to the adjacent chassis.

5. The invention of claim 4 in which the wheel trucks having the pavement-engaging wheels are non-rotatively connected to their respective chassis and the wheel trucks having the rail-engaging wheels have a horizontally rotative connection to their respective chassis.

6. A convertible vehicle having a pair of wheel-mounted chassis, a cargo body on one of said chassis, means to shift the cargo body longitudinally on the chassis in either direction to project one end beyond the end of the chassis and to hold the body in shifted position, the projecting end of the body constituting the forward end thereof, and a hitch on each end of the cargo body, each hitch being adapted to connect to a tow vehicle when the cargo body end on which the same is carried is projected.

7. A convertible vehicle comprising a railway boxcar body, a plurality of trucks mounted under said body, one of the trucks being provided with wheels having pavement-engaging, pneumatically tired wheels and another truck being provided with flanged, rail-engaging wheels, means for selectively raising and lowering each of the mentioned trucks and their respective wheels toward and from the boxcar body, the boxcar body tipping in a vertical plane about the wheels that are disposed in a lowered position, and draft means disconnectable from the boxcar body but arranged under an end of the boxcar body when such means is in an operative position to support said end of the boxcar body, the axis of the connection between the draft means and the boxcar body being vertical and arranged underneath the latter and on top of the draft means.

8. In a convertible vehicle adapted to be alternatively connected to a highway truck or a railroad truck, either of said trucks making the mentioned connection underneath the vehicle to support the same, the improvement therein comprising truck means adapted to support the end of said vehicle opposite to the end to which the respective first-mentioned truck is connected, said improvement comprising means to engage a roadway or a railroad track, to wit, respectively pavement-engaging pneumatic tires or flanged rail-engaging wheels, and means to adjust the truck means for selectively raising and lowering said tires and said wheels.

References Cited in the file of this patent

UNITED STATES PATENTS

| | | |
|---|---|---|
| 27,547 | Kaufman | Mar. 20, 1860 |
| 2,043,034 | Dalton | June 2, 1936 |